US011286093B2

(12) United States Patent
King (10) Patent No.: US 11,286,093 B2
(45) Date of Patent: Mar. 29, 2022

(54) ELASTOMER LINED SELF-LOCKING TIE

(71) Applicant: Lock Right, LLC, West Valley City, UT (US)

(72) Inventor: Creighton King, West Valley City, UT (US)

(73) Assignee: Lock Right, LLC, West Valley City, UT (US)

( * ) Notice: Subject to any disclaimer, the term of this patent is extended or adjusted under 35 U.S.C. 154(b) by 0 days.

(21) Appl. No.: 16/909,776

(22) Filed: Jun. 23, 2020

(65) Prior Publication Data

US 2020/0391917 A1    Dec. 17, 2020

Related U.S. Application Data

(63) Continuation of application No. 16/502,002, filed on Jul. 2, 2019, now Pat. No. 10,689,173, which is a
(Continued)

(51) Int. Cl.
*B65D 63/10* (2006.01)
*F16L 3/233* (2006.01)
(Continued)

(52) U.S. Cl.
CPC ..... *B65D 63/1027* (2013.01); *B65D 63/1072* (2013.01); *F16L 3/2334* (2013.01);
(Continued)

(58) Field of Classification Search
CPC ............ B65D 63/1027; B65D 63/1072; B65D 2563/101; B65D 2563/103; F16L 3/2334; H02G 3/32
See application file for complete search history.

(56) References Cited

U.S. PATENT DOCUMENTS 3,102,311 A    9/1963    Martin et al.
3,837,047 A    9/1974    Bunnell
(Continued)

FOREIGN PATENT DOCUMENTS

| JP | H06-346907 A | 12/1994 |
| JP | 2010-265922 A | 11/2010 |
| JP | 2012-060706 A | 3/2012 |

OTHER PUBLICATIONS

European Patent Office as International Searching Authority, "Search Report and Written Opinion," International Application No. PCT/US2016/014981, dated Apr. 28, 2016.
(Continued)

*Primary Examiner* — David M Upchurch
(74) *Attorney, Agent, or Firm* — Dentons Durham Jones Pinegar (57) ABSTRACT

An elastomer lined self-locking tie includes an elongated strap, at least one cavity or recess in the elongated strap, an elastomer segment, and a locking head. The elongated strap includes a head end positioned opposite a tapered end. The tapered end includes a first surface positioned opposite a second surface. The cavity is positioned in either the first surface or the second surface. The elastomer segment is positioned within the cavity and extends beyond either the first surface or the second surface. The locking head extends from the head end of the elongated strap and includes an orifice shaped to receive the tapered end of the elongated strap and the elastomer segment.

20 Claims, 6 Drawing Sheets

Related U.S. Application Data continuation of application No. 16/120,430, filed on Sep. 3, 2018, now Pat. No. 10,336,519, which is a continuation of application No. 15/007,067, filed on Jan. 26, 2016, now Pat. No. 10,065,777.

(60) Provisional application No. 62/249,002, filed on Oct. 30, 2015, provisional application No. 62/108,010, filed on Jan. 26, 2015.

(51) Int. Cl.
*F16L 3/23* (2006.01)
*H02G 3/32* (2006.01)

(52) U.S. Cl.
CPC .. *B65D 2563/101* (2013.01); *B65D 2563/103* (2013.01); *H02G 3/32* (2013.01)

(56) References Cited

U.S. PATENT DOCUMENTS

| | | | |
|---|---|---|---|
| 4,001,898 A | 1/1977 | Caveney | |
| 4,183,119 A | 1/1980 | Stewart et al. | |
| 4,236,280 A | 12/1980 | Kreiseder | |
| 4,272,870 A | 6/1981 | McCormick | |
| 4,688,302 A | 8/1987 | Caveney et al. | |
| 4,897,899 A | 2/1990 | Shely et al. | |
| 4,951,362 A | 8/1990 | Denemark et al. | |
| 5,193,254 A | 3/1993 | Geisinger | |
| 5,267,373 A | 12/1993 | Chisek | |
| 5,295,285 A | 3/1994 | Shely | |
| 5,924,171 A | 7/1999 | Sorensen et al. | |
| 6,044,524 A | 4/2000 | Sorensen et al. | |
| 6,138,327 A | 10/2000 | Powell et al. | |
| 6,347,434 B1 | 2/2002 | Newman | |
| 8,413,306 B2 | 4/2013 | Gallant et al. | |
| 8,479,361 B2 * | 7/2013 | Every | B65D 63/1063 24/16 PB |
| 8,510,918 B2 | 8/2013 | Shilale et al. | |
| 8,726,468 B2 * | 5/2014 | Dyer | B65D 63/10 24/16 PB |
| 10,065,777 B2 | 9/2018 | King | |
| D835,495 S * | 12/2018 | Votel | D8/356 |
| 10,336,519 B2 | 7/2019 | King | |
| 2006/0123603 A1 | 6/2006 | Hewes | |
| 2006/0162130 A1 | 7/2006 | Cook | |
| 2008/0164383 A1 | 7/2008 | Gunzburger | |
| 2010/0146742 A1 | 6/2010 | Every | |
| 2010/0236030 A1 | 9/2010 | Dyer | |
| 2010/0292793 A1 | 11/2010 | Höglund | |
| 2012/0272485 A1 | 11/2012 | Liang | |
| 2013/0067695 A1 * | 3/2013 | Giotto | B65D 63/1072 24/16 PB |
| 2013/0131721 A1 | 5/2013 | Belanger et al. | |
| 2014/0165339 A1 | 6/2014 | Yuan | |
| 2014/0290015 A1 | 10/2014 | Barron | |
| 2015/0210453 A1 | 7/2015 | Liang | |
| 2016/0214776 A1 | 7/2016 | King | |

OTHER PUBLICATIONS

European Patent Office as International Searching Authority, "International Preliminary Report on Patentability," International Application No. PCT/US2016/014981, dated Aug. 1, 2017.

European Patent Office, "Communication pursuant to Article 94(3) EPC," European Application No. 16706925.1, dated Nov. 27, 2018.

European Patent Office, "Communication pursuant to Article 94(3) EPC," European Application No. 16706925.1, dated Sep. 30, 2019.

Canadian Intellectual Property Office, "Notice of Allowance," Canadian Application No. 3012172, dated Aug. 14, 2018.

IP Australia, "Examination Report No. 1," Australian application No. 2018360573, dated Jan. 27, 2021.

USPTO as International Searching Authority, "International Search Report and Written Opinion," International Application No. PCT/US2018/58308, dated Jan. 22, 2019.

* cited by examiner

ELASTOMER LINED SELF-LOCKING TIE

CROSS-REFERENCE TO RELATED APPLICATIONS

This application is a continuation of U.S. patent application Ser. No. 16/502,002, filed on Jul. 2, 2019 and titled ELASTOMER LINED SELF-LOCKING TIE ("the '002 Application"), now U.S. Pat. No. 10,689,173, issued Jun. 23, 2020, which is a continuation of U.S. patent application Ser. No. 16/120,430, filed on Sep. 3, 2018 and titled ELASTOMER LINED SELF-LOCKING TIE ("the '430 Application"), now U.S. Pat. No. 10,336,519, issued Jul. 2, 2019, which is a continuation of U.S. patent application Ser. No. 15/007,067, filed on Jan. 26, 2016 and titled APPARATUS, SYSTEM, AND METHOD FOR AN ELASTOMER LINED SELF LOCKING TIE, now U.S. Pat. No. 10,065,777, issued on Sep. 4, 2018 ("the '067 Application"), which claims the benefit of the Jan. 26, 2015 filing date of U.S. Provisional Patent Application No. 62/108,010 titled ELASTOMER LINED SELF LOCKING TIE ("the '010 Provisional Application") and of the Oct. 30, 2015 filing date of U.S. Provisional Patent Application No. 62/249,002 titled APPARATUS, SYSTEM, AND METHOD FOR AN ELASTOMER LINED SELF LOCKING TIE ("the '002 Provisional Application"). The entire disclosures of the '002 Application, the '430 Application, the '067 Application, the '010 Provisional Application, and the '002 Provisional Application are hereby incorporated herein.

TECHNICAL FIELD

This disclosure relates to self-locking ties and more particularly relates to elastomer lined self-locking ties.

BACKGROUND

Self-locking ties are conventionally known as cable ties, tie-wraps, hose ties, or zip ties. A self-locking ties is a type of fastener for holding items together. A common use for self-locking ties is to hold electric cables or wires together. Conventional self-locking ties are constructed with smooth sides and rigid edges. The rigid edges of a conventional self-locking tie can easily damage an electric cable.

The use of self-locking ties is not limited to electric cables or wires. For example, self-locking ties may be used to hold painted items together. The relatively rigid edges of a conventional self-locking tie may damage the very objects it is intended to collect and organize. The hard edges of the self-locking tie straps may cut into, scratch, and otherwise damage the surface of its collected objects.

Another common use for self-locking ties includes the use of a conventional self-locking tie as a physical restraint for a person being arrested by law enforcement in a manner similar to the way law enforcement typically uses handcuffs. When used in law enforcement, conventional self-locking ties may cause injury when used as a temporary restraint by cutting and bruising skin or cutting off circulation. Injuries resulting from the use of conventional self-locking ties may create liability problems for law enforcement.

Furthermore, the hard and inflexible nature of the conventional tie offers little or no friction between the tie straps and the objects they encompass. In other words, conventional self-locking ties merely encompass objects as opposed to securely gripping them and holding them in place. This lack of friction between the self-locking tie and the encompassed objects often results in an incomplete cinch around the encompassed objects. The self-locking tie can therefore wiggle, slide, or otherwise move around the objects it is intended to securely hold in place. This movement in the self-locking tie creates stress points, breaking points, or fracture lines that lead the self-locking tie to fail completely.

SUMMARY

From the foregoing discussion, it is apparent that a need exists for an apparatus, system, and method for a self-locking tie that avoids damage to the objects collected by the self-locking tie and securely encompasses such objects. Beneficially, such an apparatus, system, and method would extend the life of the self-locking tie by avoiding stress points, breaking points, or fracture lines in the self-locking tie.

The disclosed self-locking tie has been developed in response to the state of the art, and in particular, in response to the problems and needs in the art that have not yet been fully solved by currently available self-locking ties. Accordingly, the self-locking tie has been developed to overcome many or all of the above-discussed shortcomings in the art.

The apparatus, in one embodiment, includes an elongated strap, at least one cavity disposed in the elongated strap, and a locking head. The elongated strap includes a head end and a tapered end. The tapered end is positioned opposite the head end on the elongated strap. The tapered end includes a first surface disposed opposite a second surface. The cavity is positioned in either the first surface or the second surface of the tapered end. The elastomer segment is positioned within the cavity and extends beyond either the first surface or the second surface of the tapered end of the elongated strap. The locking head extends from the head end of the elongated strap and includes an orifice shaped to receive the tapered end of the elongated strap and the elastomer segment.

In certain embodiments, the elastomer segment includes a cavity engaging portion and an extending portion. In such an embodiment, the cavity engaging portion substantially fills the cavity and the extending portion extends beyond either the first surface or the second surface of the tapered end of the elongated strap.

In one embodiment, the cavity is an elongated channel extending along at least a portion of a length of the tapered end of the elongated strap. In another embodiment, the at least one cavity is a series of voids disposed along at least a portion of a length of the tapered end of the elongated strap.

The apparatus, in certain embodiments, includes a series of ridges extending across at least a portion of the first surface of the elongated strap. In such an embodiment, the elastomer segment extends beyond the first surface of the tapered end of the elongated strap and beyond the series of ridges. In certain embodiments, the cavity is positioned within the first surface adjacent the series of ridges. In another embodiment, the cavity surrounds the series of ridges. In yet another embodiment, the cavity is positioned longitudinally along a center of the series of ridges. In a further embodiment, the cavity is positioned within a second surface of the elongated strap opposite the series of ridges.

The orifice in the locking head, in an exemplary embodiment, is substantially filled by the tapered end of the elongated strap and the elastomer segment when the locking head receives the tapered end of the elongated strap and the elastomer segment.

Reference throughout this specification to features, advantages, or similar language does not imply that all of the features and advantages that may be realized with the disclosed self-locking tie should be or are in any single embodiment of the self-locking tie. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Other aspects of the disclosed subject matter, as well as features and advantages of the disclosed subject matter, will become more fully apparent to those of ordinary skill in the art from the following description, the accompanying drawings, and appended claims,

DETAILED DESCRIPTION

Reference throughout this specification to "one embodiment," "an embodiment," or similar language means that a particular feature, structure, or characteristic described in connection with the embodiment is included in at least one embodiment of a self-locking tie. Thus, appearances of the phrases "in one embodiment," "in an embodiment," and similar language throughout this specification may, but do not necessarily, all refer to the same embodiment.

Furthermore, the described features, structures, or characteristics of a self-locking tie may be combined in any suitable manner in one or more embodiments. In the following description, numerous specific details are provided for a thorough understanding of embodiments of self-locking ties. One skilled in the relevant art will recognize, however, that the disclosed subject matter may be practiced without one or more of the specific details, or with other methods, components, materials, and so forth. In other instances, well-known structures, materials, or operations are not shown or described in detail to avoid obscuring aspects of the disclosed subject matter.

Self-locking ties, known as cable ties or zip ties, are used to fasten objects, or pieces of objects together. This disclosure relates to a new self-locking tie that provides improvements over conventional self-locking ties.

Self-locking ties are vulnerable to breaking at stress points created when encompassing objects of various dimensions. Self-locking ties typically comprise a tie head and a tie strap. Self-locking ties are typically composed of materials that are hard and inflexible. The hard and inflexible nature of self-locking ties creates kinks in the tie strap that weaken and eventually break the strap when it comes under great stress.

Additionally, conventional self-locking ties are constructed with smooth sides and rigid edges. The hard and inflexible nature of the conventional tie offers little or no friction between the tie straps and the objects they encompass. In other words, conventional self-locking ties merely encompass objects as opposed to securely gripping them and holding them in place. This lack of friction between the self-locking tie and the encompassed objects often results in an incomplete cinch around the encompassed objects. The self-locking tie can therefore wiggle, slide, or otherwise move around the objects it is intended to securely hold in place. This movement in the self-locking tie creates stress points, breaking points, or fracture lines in the self-locking tie that lead the self-locking tie to fail completely.

Furthermore, the smooth nature of the self-locking tie makes it more difficult to secure the tie system at the greatest maximum tension. The self-locking tie's smooth surface may create a slack in the tension of the tie system as a user releases the self-locking tie when attempting to secure the self-locking tie as tight as possible.

In use, a self-locking tie's contact points may damage the very objects it is intended to collect and organize. The hard edges of the self-locking tie straps may cut into, scratch, and otherwise damage the surface of its collected objects. For example, law enforcement agencies occasionally use conventional self-locking ties as a physical restraint for a person being arrested, in a manner similar to the way law enforcement typically uses handcuffs. When used in law enforcement, conventional self-locking ties may cause injury when used as a temporary restraint by cutting and bruising skin or cutting off circulation. Injuries resulting from the use of conventional self-locking ties may create liability problems for law enforcement.

It is therefore one object of the disclosure to include a flexible component to the self-locking tie to minimize kinks and stress points thereby reducing the tie's vulnerability to wear and tear and breaking. It is a further object of this disclosure to provide a tie that secures objects with the greatest maximum pressure. Another object of the disclosure is to provide a self-locking tie that secures objects without damaging or injuring them.

Figure 1:
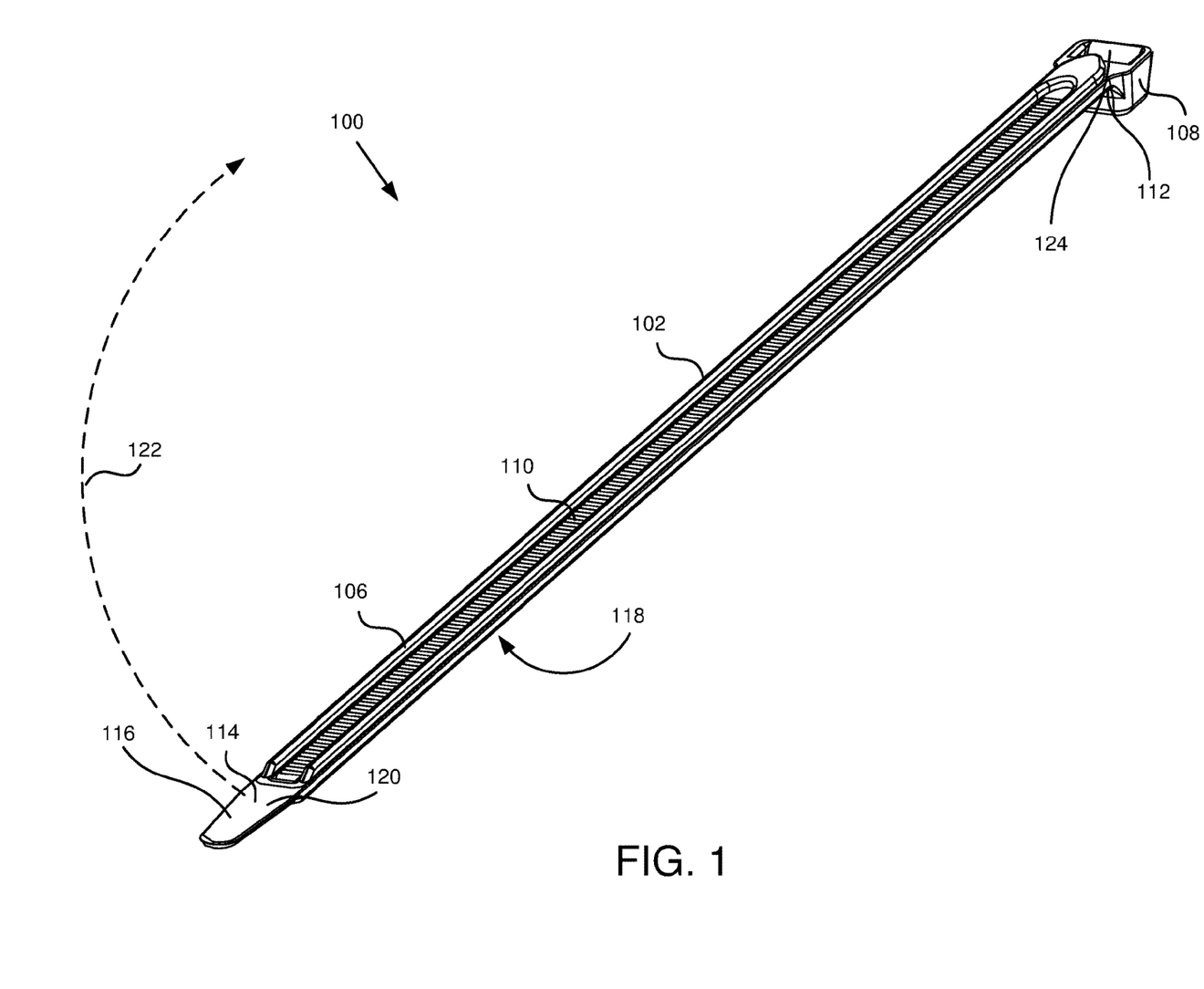
FIG. 1 is a perspective view illustrating one embodiment of a self-locking tie in accordance with the present subject matter.

Accordingly, the present subject matter is directed to an elastomer lined self-locking tie which substantially eliminates many or all of the above discussed problems with conventional self-locking ties. For example, FIG. 1 is a perspective view illustrating one embodiment of a self-locking tie 100 in accordance with the present subject matter.

The self-locking tie 100, in one embodiment, includes an elongated strap 102, at least one cavity 104 (see FIG. 2), an elastomer segment 106, and a locking head 108. In certain embodiments, the self-locking tie 100 also includes a series of ridges 110 that extend across at least a portion of at least one surface of the elongated strap 102.

The elongated strap 102, in certain embodiments, is composed of pliable material such as nylon, plastic, etc. Thus, the elongated strap 102 is bendable, allowing it to encompass one or more objects of various dimensions. The elongated strap 102 includes a head end 112 disposed opposite a tapered end 114. The locking head 108 is positioned on, coupled to, or integrally formed on the head end 112 of the elongated strap 102.

In certain embodiments, the tapered end 114 of the elongated strap 102 comprises a substantially planar, pliable strap, extended in a lengthwise direction. In one embodiment, the tapered end 114 of the elongated strap 102 can be considered the portion of the elongated strap 102 extending from a position wherein the locking head 108 is positioned on, coupled to, or otherwise integrally formed on the head end 112 of the elongated strap 102.

The tapered end 114 of the elongated strap 102 includes a first surface 116 disposed opposite a second surface 118. In the embodiment illustrated in FIG. 1, the series of ridges 110 are depicted as extending across the first surface 116 of the tapered end 114 of the elongated strap 102. In other embodiments, the series of ridges 110 extend across the second surface 118 of the elongated strap 102. As depicted, the series of ridges 110 are formed across most of the length of the tapered end 114 of the elongated strap 102. In other embodiments, the series of ridges 110 may be formed across a portion of the length of the tapered end 114 of the elongated strap 102 that is less than the entire length of the tapered end 114 of the elongated strap 102.

A tapered grasping tab 120 extends from the tapered end 114 of the elongated strap 102. In use, a user moves the tapered grasping tab 120 in the direction indicated by arrow 122 and into an orifice 124 in the locking head 108 on the head end 112 of the elongated strap 102 to form a loop with the elongated strap 102. The tapered nature of the tapered grasping tab 120 facilitates insertion of the tapered grasping tab 120 into the orifice 124 in the locking head 108 on the head end 112 of the elongated strap 102. The orifice 124 in the locking head 108 is sized and shaped to receive the tapered end 114 of the elongated strap 102 and to receive the elastomer segment 106 which extends beyond the first surface 116 of the tapered end 114 of the elongated strap 102.

Figure 2:
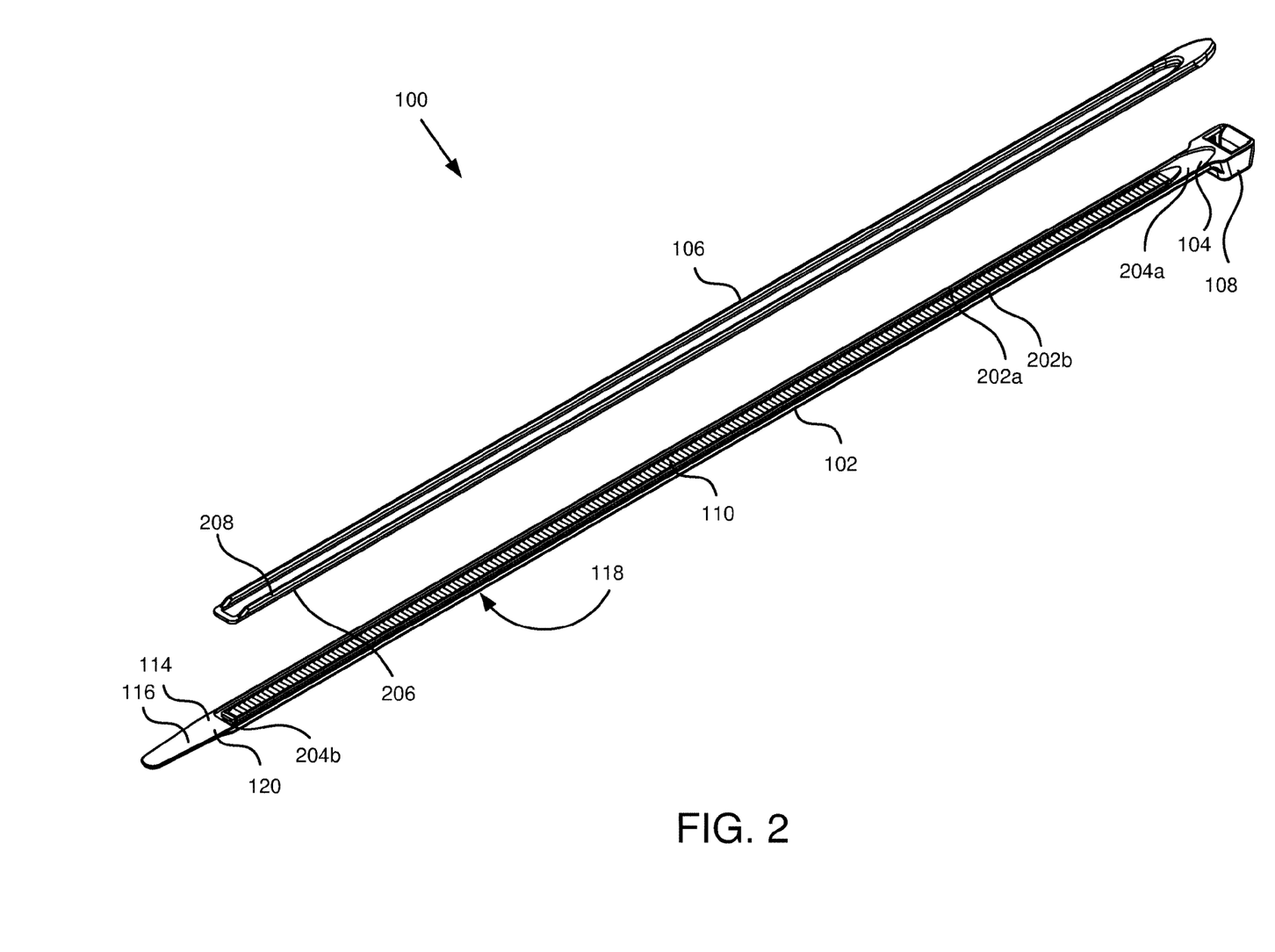
FIG. 2 is an exploded perspective view further illustrating the self-locking tie of FIG. 1 in accordance with one embodiment of the present subject matter.

FIG. 2 is an exploded perspective view illustrating the self-locking tie 100 of FIG. 1 in accordance with one embodiment of the present subject matter. In the embodiment illustrated in FIG. 2, the elastomer segment 106 has been removed from the first surface 116 of the tapered end 114 of the elongated strap 102 to more clearly illustrate the cavity 104 disposed in the first surface 116 of the tapered end 114 of the elongated strap 102.

The cavity 104, in one embodiment, is an elongated channel that extends along at least a portion of the length of the tapered end 114 of the elongated strap 102. For example, in the embodiment illustrated in FIG. 2, the cavity 104 comprises two channels 202a and 202b (collectively channels 202) that extend along both sides of the series of ridges 110 formed across most of the length of the tapered end 114 of the elongated strap 102. The channels 202 are connected to one another by end recesses 204a and 204b (collectively end recesses 204) at either end of the tapered end 114 of the elongated strap 102.

In other embodiments, the cavity 104 may include channels 202 that extend along both sides of the series of ridges 110 but which are not connected to one another with end recesses 204. In another embodiment, the channels 202 may extend for a length substantially less than the length of the tapered end 114 of the elongated strap 102. In yet another embodiment, the cavity 104 includes a series of voids (see FIGS. 7A and 7B) disposed along at least a portion of a length of the tapered end 114 of the elongated strap 102.

In any of the above described embodiments, at least a portion of the elastomer segment 106 is positioned within the cavity 104 to facilitate coupling the elastomer segment 106 to the tapered end 114 of the elongated strap 102. For example, in certain embodiments, the elastomer segment 106 includes a cavity engaging portion 206 which is received within the cavity 104. Disposing the cavity engaging portion 206 of the elastomer segment 106 within the cavity 104 helps to maintain a coupling between the elastomer segment 106 and the tapered end 114 of the elongated strap 102 due to the fact that the cavity engaging portion 206 of the elastomer segment 106 is surrounded by the cavity 104 on three sides of the cavity 104.

An extending portion 208 of the elastomer segment 106 extends above the plane of the first surface 116 of the tapered end 114 of the elongated strap 102. The elastomer segment 106 is a flexible material which may be may be comprised of materials such as silicone, rubber, thermoplastic elastomer, foam, or other materials with similar properties. The soft and flexible quality of the elastomer segment 106 enable the self-locking tie 100 to encompass one or more objects of various dimension and minimize kinks and stress points thereby reducing the self-locking tie's 100 vulnerability to wear and tear and breaking.

The friction provided by the elastomer segment 106 permits the self-locking tie 100 to grip objects more securely, holding them in place. However, the increased friction provided by the elastomer segment 106 also subjects the elastomer segment 106 to lateral forces that would not otherwise be encountered. If the elastomer segment 106 were directly coupled to the first surface 116 of the tapered end 114 of the elongated strap 102, the lateral forces may cause the elastomer segment 106 to become separated from the first surface 116 of the tapered end 114 of the elongated strap 102. The cavity engaging portion 206 of the elastomer segment 106 along with the cavity 104 maintain the coupling between the elastomer segment 106 and the first surface 116 of the tapered end 114 of the elongated strap 102. The ability to hold objects more securely in place also enables the self-locking tie 100 to secure objects with less slack. The soft nature of the elastomer segment 106 also allows the self-locking tie 100 to secure objects without damaging or injuring them. For example, the soft nature of the elastomer segment 106 allows a user to position the self-locking tie 100 about a painted or otherwise finished object without worry that the paint may become scratched or otherwise damaged by the self-locking tie 100. This is particularly true in situations where the self-locking tie 100 may move or vibrate when in use.

In certain embodiments, the self-locking tie 100 is formed in a two-step overmolding process. In the first step, the elongated strap 102 is formed using conventional methods known in the art. An overmold is then positioned on the elongated strap 102 and a second molding step is performed to mold the elastomer segment 106 onto the elongated strap 102 with the cavity engaging portion 206 of the elastomer segment 106 positioned within the cavity 104.

Figure 3:
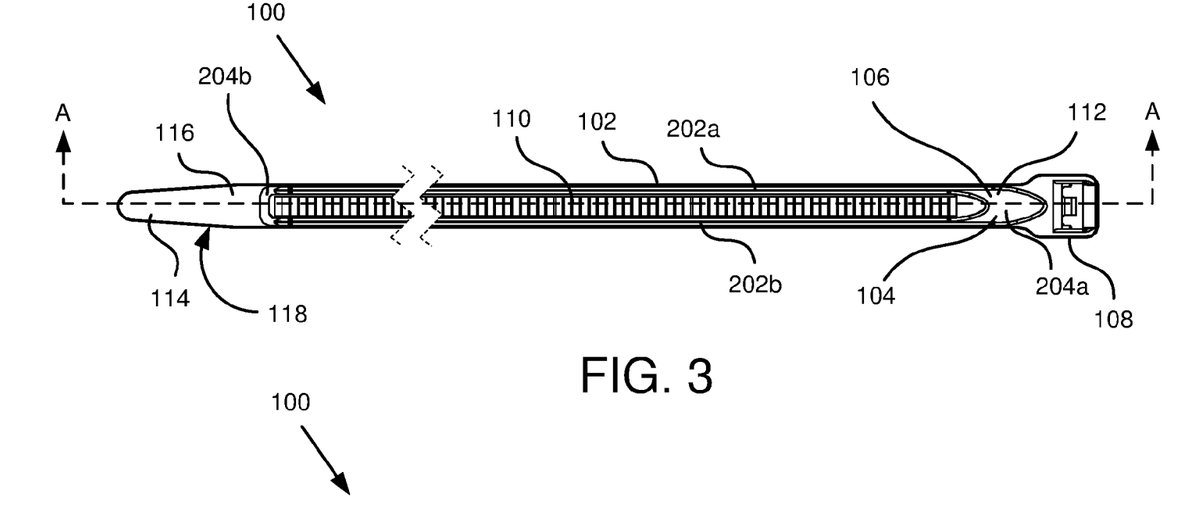
FIG. 3 is a top view further illustrating the self-locking tie of FIG. 1 in accordance with one embodiment of the present subject matter.

FIG. 3 is a top view further illustrating the self-locking tie 100 of FIG. 1 in accordance with one embodiment of the present subject matter. As discussed above, in certain embodiments, the cavity 104 includes a pair of channels 202a and 202b that extend along each side of the series of ridges 110 disposed on the first surface 116 of the tapered end 114 of the elongated strap 102. The channels 202 are connected to one another by end recesses 204a and 204b at either end of the tapered end 114 of the elongated strap 102. In the illustration depicted in FIG. 3, the channels 202a and 202b and the end recesses 204a and 204b are obscured from view by the elastomer segment 106. However, one of skill in the art will recognize that the channels 202a and 202b and the end recesses 204a and 204b are positioned below the elastomer segment 106 and have been labeled as such.

In other embodiments, the elongated strap 102 may include a single channel (not shown) that runs longitudinally down a center of the series of ridges 110 disposed on the first surface 116 of the tapered end 114 of the elongated strap 102. In such an embodiment, the elastomer segment 106 may be a single strip of elastomeric material that is positioned within the single channel. One of skill in the art will recognize that the cavity 104 may take many other forms without departing from the spirit or essential characteristic of the present disclosure.

Figure 4:
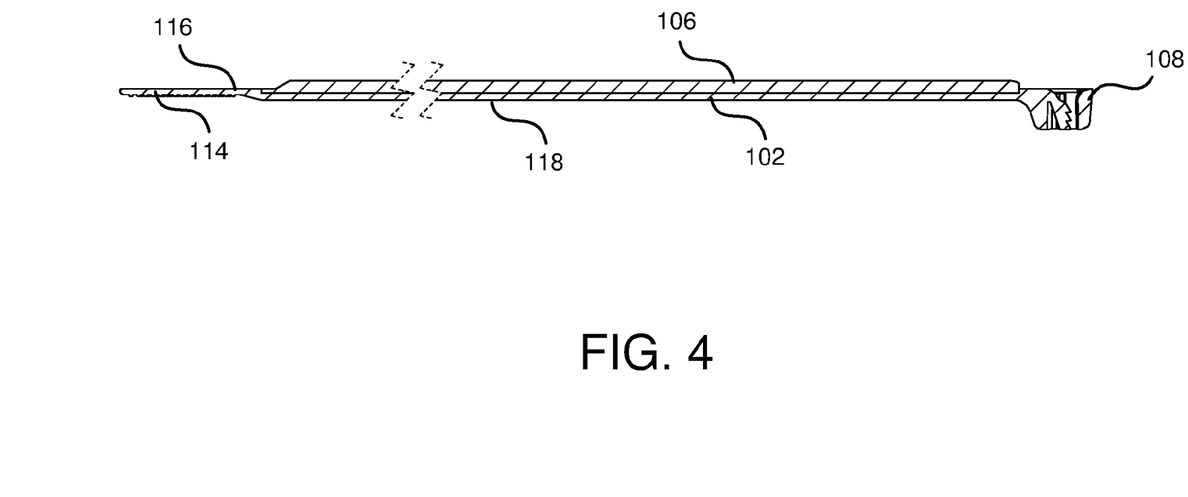
FIG. 4 is a side cutaway view taken along line A-A of FIG. 3 further illustrating the self-locking tie in accordance with one embodiment of the present subject matter.

FIG. 4 is a side cutaway view taken along line A-A of FIG. 3 further illustrating the self-locking tie 100 in accordance with another embodiment of the present subject matter. In FIG. 3, the elastomer segment 106 can be clearly seen as being positioned within channel 202a such that a portion (i.e., the cavity engaging portion 206) of the elastomer segment 106 is disposed below the first surface 116 of the tapered end 114 of the elongated strap 102 and a second portion (i.e., extending portion 208) extends above the plane of the first surface 116 of the tapered end 114 of the elongated strap 102.

Figure 5:
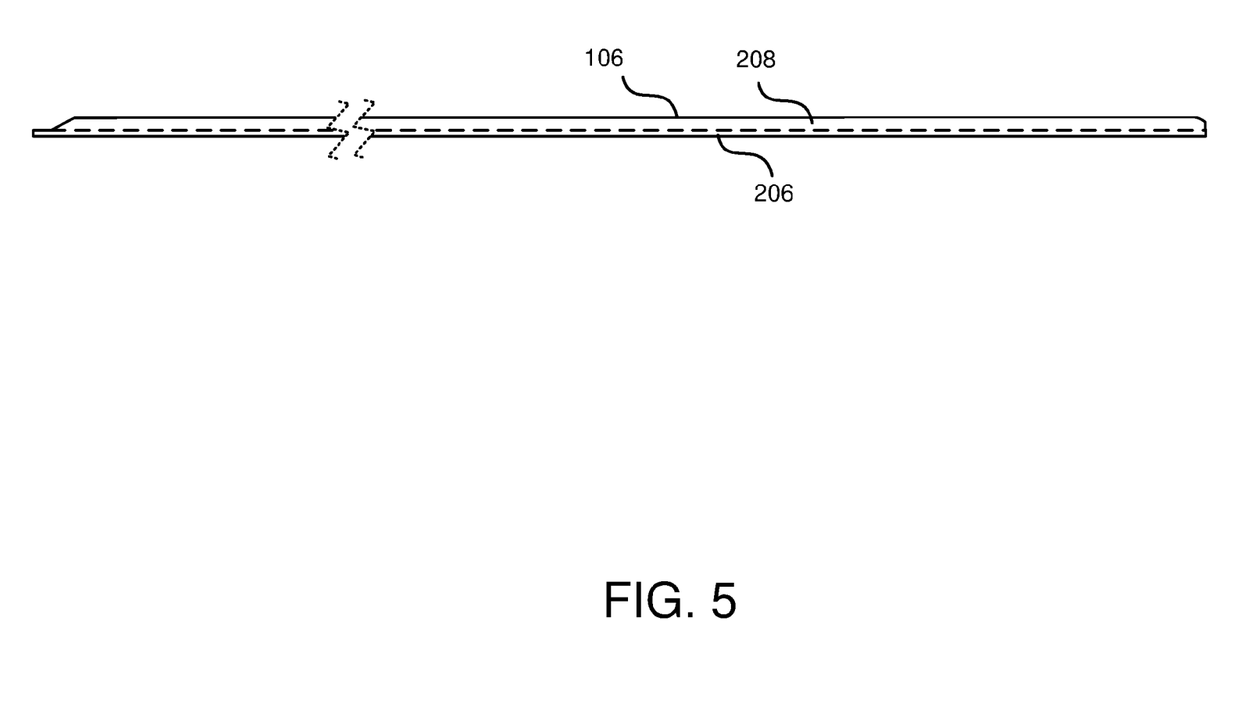
FIG. 5 is a side view further illustrating the elastomer segment of the self-locking tie of FIGS. 1-4 in accordance with another embodiment of the present subject matter.

FIG. 5 is a side view further illustrating the elastomer segment 106 of the self-locking tie 100 of FIGS. 1-4 in accordance with another embodiment of the present subject matter. As discussed above, the elastomer segment 106 includes two portions, the cavity engaging portion 206 and the extending portion 208.

In certain embodiments, the cavity engaging portion 206 of the elastomer segment 106 has a depth that is approximately the same as a depth of the extending portion 208. In other embodiments, such as in the embodiment illustrated in FIG. 5, the depth of the cavity engaging portion 206 of the elastomer segment 106 is smaller than the depth of the extending portion 208. In yet another embodiment, the depth of the cavity engaging portion 206 of the elastomer segment 106 is larger than the depth of the extending portion 208.

The cavity engaging portion 206 is received within the cavity 104. The cavity engaging portion 206 substantially fills the cavity 104 such that the cavity engaging portion 206 of the elastomer segment 106 is surrounded by the cavity 104 on three sides of the cavity 104. Positioning the cavity engaging portion 206 of the elastomer segment 106 within the cavity 104 helps to maintain a coupling between the elastomer segment 106 and the tapered end 114 of the elongated strap 102 due to the fact that the cavity engaging portion 206 of the elastomer segment 106 is surrounded by the cavity 104 on three sides of the cavity 104.

The extending portion 208 of the elastomer segment 106 extends above the plane of the first surface 116 of the tapered end 114 of the elongated strap 102. The soft and flexible quality of the elastomer segment 106 enable the self-locking tie 100 to encompass one or more objects of various dimensions and minimize kinks and stress points, thereby reducing the self-locking tie's 100 vulnerability to wear, tear, and breaking.

With the extending portion 208 extending beyond the plane of the first surface 116 of the tapered end 114 of the elongated strap 102, the extending portion 208 increases friction between the elongated strap 102 and any items encompassed by the elongated strap 102. The increased friction provided by the elastomer segment 106 subjects the elastomer segment 106 to lateral forces that would not otherwise be encountered. If the elastomer segment 106 were directly coupled to the first surface 116 of the tapered end 114 of the elongated strap 102, the lateral forces may cause the elastomer segment 106 to become separated from the first surface 116 of the tapered end 114 of the elongated strap 102.

Figure 6:
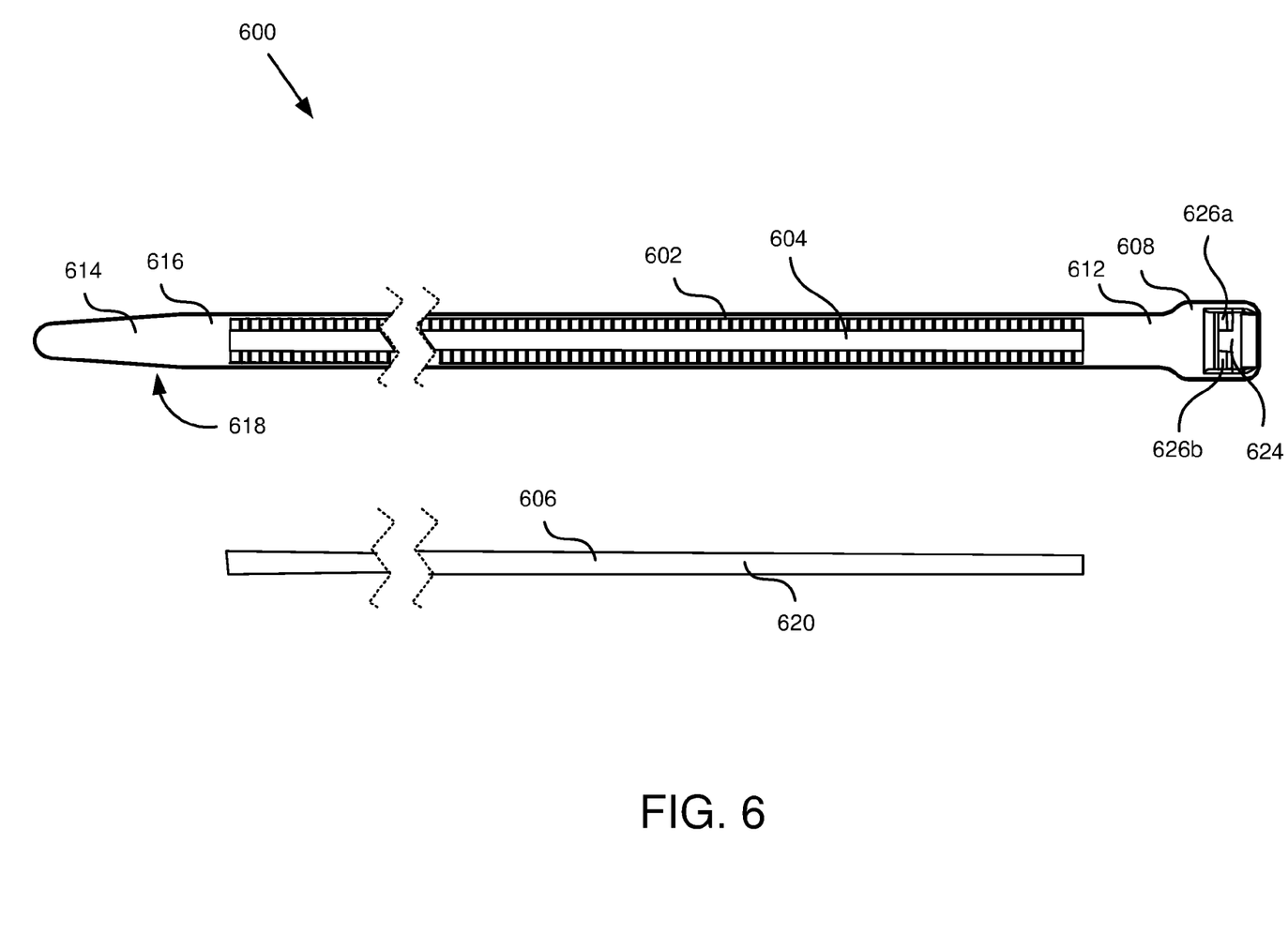
FIG. 6 is a top view illustrating another embodiment of a self-locking tie in accordance with the present subject matter.

FIG. 6 is a top view illustrating another embodiment of a self-locking tie 600 in accordance with the present subject matter. In certain embodiments, the self-locking tie 600 is substantially similar to the self-locking tie 100 discussed above. Thus, the self-locking tie 600 includes an elongated strap 602, at least one cavity 604, an elastomer segment 606, and a locking head 608.

The elongated strap 602, in certain embodiments, comprises a pliable material such as nylon, plastic, etc. Thus, the elongated strap 602 is bendable to encompass one or more objects of various dimension. The elongated strap 602 includes a head end 612 disposed opposite a tapered end 614. The locking head 608 is positioned on, coupled to, or integrally formed on the head end 612 of the elongated strap 602.

In certain embodiments, the tapered end 614 of the elongated strap 602 comprises a substantially planar, pliable strap extended in a lengthwise direction. In one embodiment, the tapered end 614 of the elongated strap 602 can be considered the portion of the elongated strap 602 extending from a position wherein the locking head 608 is positioned on, coupled to, or otherwise integrally formed on the head end 612 of the elongated strap 602.

The tapered end 614 of the elongated strap 602 includes a first surface 616 disposed opposite a second surface 618. In the embodiment illustrated in FIG. 6, a series of ridges 610a and 610b (collectively series of ridges 610) are depicted as extending across the first surface 616 of the tapered end 614 of the elongated strap 602. The series of ridges 610 extend across only a portion of the first surface 616 of the tapered end 614 of the elongated strap 602 on opposing sides of the cavity 604. The cavity 604 is disposed longitudinally along a center of a series of ridges 610. In other embodiments, the series of ridges 610 and the cavity 604 are disposed on the second surface 618 of the elongated strap 602.

The elastomer segment 606 is sized and shaped to be received within the cavity 604. As with the elastomer segment 106 discussed above, the elastomer segment 606 includes a cavity engaging portion and an extending portion 620. Because the view in FIG. 6 is a top view, only the extending portion 620 of the elastomer segment 606 can be seen.

The cavity engaging portion and the extending portion 620 of the elastomer segment 606 of the self-locking tie 600 operate in a manner substantially similar to the manner in which the cavity engaging portion 206 and the extending portion 208 of the self-elastomer segment 106 of the locking tie 100 operate. Thus, the cavity engaging portion substantially fills the cavity 604 and is surrounded on at least three sides to facilitate coupling between the elastomer segment 606 and the elongated strap 602. Similarly, the extending portion 620 of the elastomer segment 606 extends beyond a plane of the first surface 616 of the tapered end 614 of the elongated strap 602.

An orifice 624 in the locking head 608 is sized and shaped to receive the tapered end 614 of the elongated strap 602 and to receive the elastomer segment 606 of the self-locking tie 600. Pawls 626a and 626b are configured to engage the series of ridges 610 on either side of the cavity 604 or elastomer segment 606 to maintain the tapered end 614 of the elongated strap 602 at a desired position within the locking head 608.

While the embodiments depicted herein all illustrate the elastomer segment 106 or 606 and the series of ridges 110 or 610 disposed on the first surface 116 or 616 of the tapered end 114 or 614 of the elongated strap 102 or 602, one of skill in in the art will recognize that the elastomer segment 106 or 606 and the series of ridges 110 or 610 may be disposed on opposing surfaces. That is, in one embodiment, the elastomer segment 106 or 606 may be positioned on the second surface 118 or 618 while the series of ridges 110 or 610 are disposed on the first surface 116 or 616. Of course, the opposite is also true. That is, in other embodiments, the elastomer segment 106 or 606 may be positioned on the first surface 116 or 616 while the series of ridges 110 or 610 are disposed on the second surface 118 or 618.

Figure 7A:
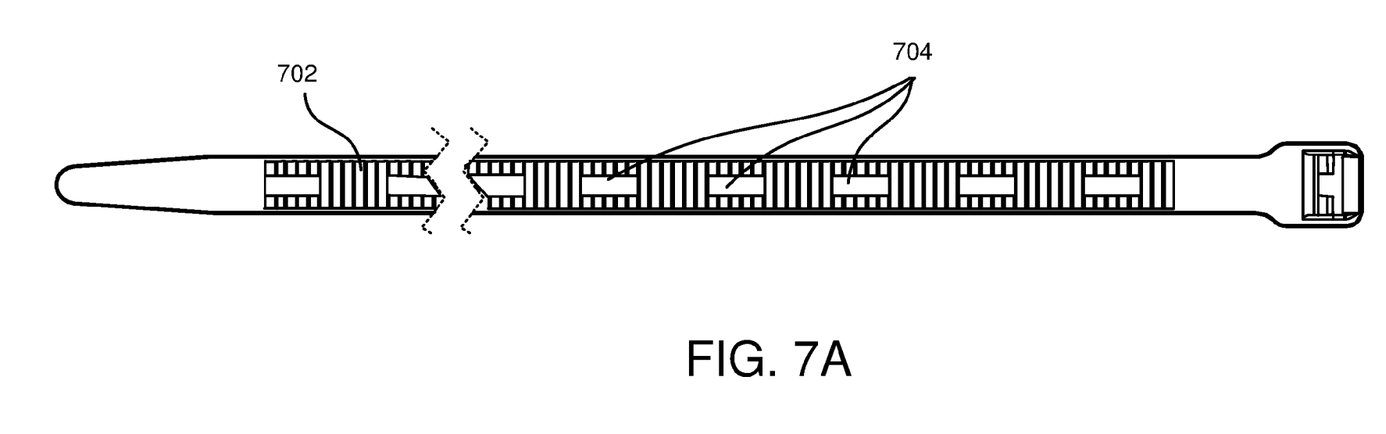
FIG. 7A is a top view illustrating another embodiment of an elongated strap in accordance with the present subject matter.

FIG. 7A is a top view illustrating another embodiment of an elongated strap 702 in accordance with the present subject matter. In certain embodiments, instead of including a continuous cavity, such as cavities 104 or 604 discussed above, the at least one cavity 704 includes a series of voids disposed along at least a portion of a tapered end 714 of the elongated strap 702. In such an embodiment, the elastomer segment 706 includes corresponding cavity engaging portions to substantially fill the voids comprising the at least one cavity 704.

Figure 7B:
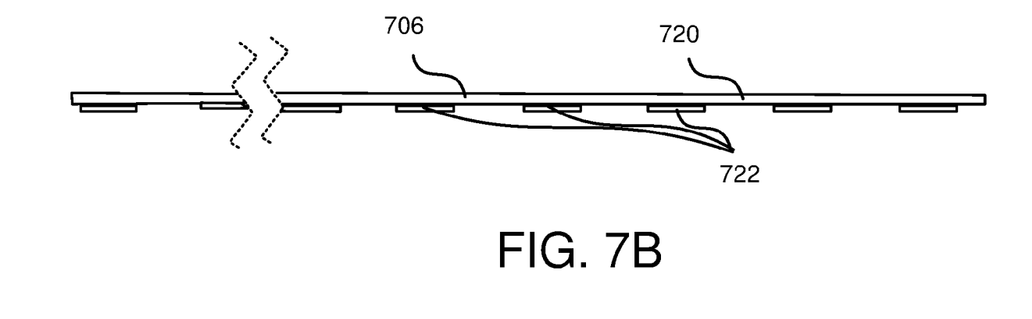
FIG. 7B is a side view illustrating one embodiment of an elastomer segment in accordance with the present subject matter.

For example, FIG. 7B is a side view illustrating one embodiment of an elastomer segment 706 in accordance with the present subject matter. In the embodiment illustrated in FIG. 7B, the elastomer segment 706 includes an extending portion 720 and a series of cavity engaging portions 722. Each of the cavity engaging portions 722 substantially fills a void comprising the at least one cavity 704 in the elongated strap 702.

The disclosed subject matter may be embodied in other specific forms without departing from its spirit or essential characteristics. The described embodiments are to be considered in all respects only as illustrative and not restrictive. The scope of each claim is, therefore, indicated only by its plain language and the legal equivalents thereto rather than by the foregoing description. All changes which fall within the meaning and range of equivalency of the claims are to be embraced within their scope.

What is claimed:

1. A self-locking tie, comprising:
    an elongated strap including a head end and a tapered end, the tapered end opposite from the head end on the elongated strap, the elongated strap comprising a first surface and a second surface;
    at least one cavity in at least one of the first surface and the second surface;
    an elastomer segment within the at least one cavity and extending beyond at least one of the first surface and the second surface;
    a locking head extending at the head end of the elongated strap and comprising an orifice shaped to receive the tapered end of the elongated strap and the elastomer segment.

2. The self-locking tie of claim 1, wherein the elastomer segment comprises a cavity engaging portion and an extending portion, wherein the cavity engaging portion substantially fills the at least one cavity and wherein the extending portion extends beyond at least one of the first surface and the second surface of the elongated strap.

3. The self-locking tie of claim 1, wherein the at least one cavity comprises an elongated channel extending along at least a portion of a length of the tapered end of the elongated strap.

4. The self-locking tie of claim 1, wherein the at least one cavity comprises a series of voids along at least a portion of a length of the tapered end of the elongated strap.

5. The self-locking tie of claim 1, further comprising a series of ridges extending across at least a portion of the first surface of the elongated strap, wherein the elastomer segment extends beyond the first surface of the elongated strap and beyond the series of ridges.

6. The self-locking tie of claim 5, wherein the at least one cavity is recessed within the first surface, adjacent to the series of ridges.

7. The self-locking tie of claim 6, wherein the at least one cavity surrounds the series of ridges.

8. The self-locking tie of claim 5, wherein the at least one cavity is located longitudinally along a center of the series of ridges.

9. The self-locking tie of claim 5, wherein the at least one cavity is recessed within the second surface opposite from the series of ridges.

10. The self-locking tie of claim 1, wherein the orifice of the locking head is substantially filled by the tapered end of the elongated strap and the elastomer segment when the locking head receives the tapered end of the elongated strap and the elastomer segment.

11. An apparatus to affix a plurality of items, the apparatus comprising:
    an elongated strap including a head end and a tapered end, the tapered end opposite from the head end on the elongated strap, the elongated strap comprising a first surface and a second surface;
    at least one cavity in at least one of the first surface and the second surface;
    an elastomer segment comprising a cavity engaging portion and an extending portion, the cavity engaging portion substantially filling the at least one cavity and the extending portion extending beyond at least one of the first surface and the second surface;
    a locking head at the head end of the elongated strap and comprising an orifice shaped to receive the tapered end of the elongated strap and the elastomer segment.

12. The apparatus of claim 11, wherein the at least one cavity comprises an elongated channel extending along at least a portion of a length of the tapered end of the elongated strap.

13. The apparatus of claim 11, further comprising a series of ridges extending across at least a portion of the first surface of the elongated strap, wherein the extending portion of the elastomer segment extends beyond the first surface of the elongated strap and beyond the series of ridges.

14. The apparatus of claim 13, wherein the at least one cavity is recessed within the first surface adjacent to the series of ridges.

15. The apparatus of claim 14, wherein the at least one cavity surrounds the series of ridges.

16. The apparatus of claim 13, wherein the at least one cavity is located longitudinally along a center of the series of ridges.

17. The apparatus of claim 13, wherein the at least one cavity is recessed within the second surface.

18. An elastomer lined self-locking tie, comprising:
   an elongated strap including a head end and a tapered end, the tapered end opposite from the head end on the elongated strap, the elongated strap comprising a first surface and a second surface;
   a series of ridges extending across at least a portion of the first surface of the elongated strap;
   a cavity in the first surface of the elongated strap, adjacent to the series of ridges;
   an elastomer segment comprising a cavity engaging portion and an extending portion, the cavity engaging portion substantially filling the cavity and the extending portion extending beyond the first surface; and
   a locking head at the head end of the elongated strap and comprising an orifice shaped to receive the tapered end of the elongated strap and the elastomer segment.

19. The elastomer lined self-locking tie of claim 18, wherein the at least one cavity surrounds the series of ridges.

20. The elastomer lined self-locking tie of claim 18, wherein the extending portion of the elastomer segment extends beyond the series of ridges in the first surface of the elongated strap.

\* \* \* \* \*